(12) United States Patent
Sze

(10) Patent No.: US 7,401,414 B1
(45) Date of Patent: Jul. 22, 2008

(54) SENSITIVE GROUND SURFACE TILTMETER

(76) Inventor: Sau Loi Sze, No. 295 Lai Chi Kok Road, Sham Shui Po, Kowloon, Room 295, 4/5, Pak Cheung Building, Hong Kong (CN)

( * ) Notice: Subject to any disclaimer, the term of this patent is extended or adjusted under 35 U.S.C. 154(b) by 0 days.

(21) Appl. No.: 11/850,658

(22) Filed: Sep. 5, 2007

(30) Foreign Application Priority Data

Jun. 7, 2007 (CN) .......................... 2007 1 0074742

(51) Int. Cl.
*E01C 23/01* (2006.01)
(52) U.S. Cl. .............................. 33/521; 33/1 H; 33/295
(58) Field of Classification Search ................... 33/521, 33/1 H, 295, 624, 707
See application file for complete search history.

(56) References Cited

U.S. PATENT DOCUMENTS 2,303,845 A * 12/1942 Krasnow ................... 73/382 R
4,290,207 A * 9/1981 Browning et al. ............. 33/295
5,224,271 A * 7/1993 Langford et al. .............. 33/293

* cited by examiner

*Primary Examiner*—Yaritza Guadalupe-McCall
(74) *Attorney, Agent, or Firm*—Global IP Services; Tianhua Gu

(57) ABSTRACT

The invention relates to a geoscientific observation technology, especially relates to a ground surface tiltmeter by using microscope for micro measuring. In order to solve the problems such as low reading accuracy and enormous error of the traditional ground surface tiltmeter, the invention provides a ground surface tiltmeter by using microscope for micro measuring, comprising a main body of the ground surface tiltmeter and a micro-measuring device, the main body of the ground surface tiltmeter is a vertical pendulum ground surface tiltmeter or a horizontal pendulum ground surface tiltmeter, the micro measuring device comprises an optical microscope, the focus of objective lens of said microscope is coincident to the reading point of the ground surface tiltmeter. The invention adopts optical microscope to amplify the ground gradient of the ground surface tiltmeter, ensures high measuring accuracy of the ground surface tiltmeter, and also makes the assembly simple, and the production cost reduced.

5 Claims, 4 Drawing Sheets

SENSITIVE GROUND SURFACE TILTMETER

CROSS REFERENCE TO THE RELATED PATENT APPLICATION

This application claims the priority of the Chinese patent application No. 200710074742.9 with a filing date of Jun. 7, 2007.

FIELD OF THE INVENTION

The invention relates to a geoscientific observation technology, specifically, relates to a sensitive ground surface tiltmeter by using microscope for micro measuring.

BACKGROUND OF THE INVENTION

The ground gradient is an important parameter for earthquake prediction and monitoring the security of dams or slopes. In order to get an accurate forecast, high accurate ground gradient changing parameters are required. The main devices presently used for observing ground gradient changes are horizontal pendulum ground surface tiltmeter and vertical pendulum ground surface tiltmeter, when using these two kinds of devices for measuring ground gradient changes, people often use their eyes to capture data, namely use eyes directly capturing the indicating value from the dial disc of the ground surface tiltmeter. As a result of resolution of human eyes, its reading often has some error. When a slight ground gradient change of the earth crust occurs, such reading is not easy to cause people's attention, and the sensitivity is not high. Presently electronic transducer is also used to convert the slight displacement change of the ground surface tiltmeter to electrical signal, which greatly improving the measuring accuracy and sensitivity of the ground surface tiltmeter, but this kind of transducer requires high precision, accurate processing and installation, thus the cost of the ground surface tiltmeter increases and its price will be high.

SUMMARY OF THE INVENTION

The object of the present invention is to solve the problems existing in conventional technology such as low measuring and reading accuracy, difficult installation and high cost of the ground surface tiltmeter, and provide a sensitive ground surface tiltmeter by using microscope for micro measuring with high-accuracy measuring, simple and convenient installation.

To solve the technical problem mentioned above, the present invention provides a sensitive ground surface tiltmeter by using microscope for micro measuring, comprising a main body of the ground surface tiltmeter and a micro-measuring device, wherein the main body of the ground surface tiltmeter is a vertical pendulum ground surface tiltmeter, comprising a support and a pendulum system. The pendulum system is a vertical pendulum system comprising a hanging thread for hanging the pendulum bob on the top of the support. The micro measuring device comprises a dial disc and an optical microscope, wherein the focus of objective lens of said microscope is coincident to the origin of coordinates of the dial disc, and the dial pointer of the pendulum bob is just opposite to the origin of coordinates of the dial disc.

In the ground surface tiltmeter by using microscope for micro measuring of the present invention, the calibration of said dial disc comprises a series of concentric circles with equidifferent radius taking the origin of coordinates as center.

In the ground surface tiltmeter by using microscope for micro measuring of the present invention, said pendulum bob is a cone, the cone tip is the calibration pointer.

Alternatively, the present invention provide a ground surface tiltmeter by using microscope for micro measuring, comprising a main body of the ground surface tiltmeter and a micro-measuring device, wherein the main body of the ground surface tiltmeter is a horizontal pendulum ground surface tiltmeter, comprising a horizontal pendulum system which comprises a horizontal connected tube. The micro measuring device is an optical microscope, and the objective lens of the said microscope is just opposite to the pointer marking the liquid level of the horizontal connected tube.

In the ground surface tiltmeter by using microscope for micro measuring of the present invention, the microscope has a calibration which is able to measure the object size in the microscope vision field.

The invention has the following advantages compared with the existing ground surface tiltmeter:

1. The invention adopts optical microscope to amplify the ground gradient of the ground surface tiltmeter, which ensures high measuring accuracy and high sensitivity of the ground surface tiltmeter.

2. The ground surface tiltmeter by using microscope for micro measuring in the invention is easy to assemble.

3. The vertical pendulum ground surface tiltmeter by using microscope for micro measuring in the invention is not only able to observe the ground gradient angle but also to observe the gradient direction.

4. The ground surface tiltmeter by using microscope for micro measuring in the invention is of low production cost.

BRIEF DESCRIPTION OF THE DRAWINGS

The present invention will be further described with reference to the accompanying drawings and embodiments hereinafter, in the accompanying drawings.

DETAILED DESCRIPTION OF THE PREFERRED EMBODIMENT

FIG. 1, FIG. 2, FIG. 3 and FIG. 4 show a first embodiment of the invention.

Figure 1:
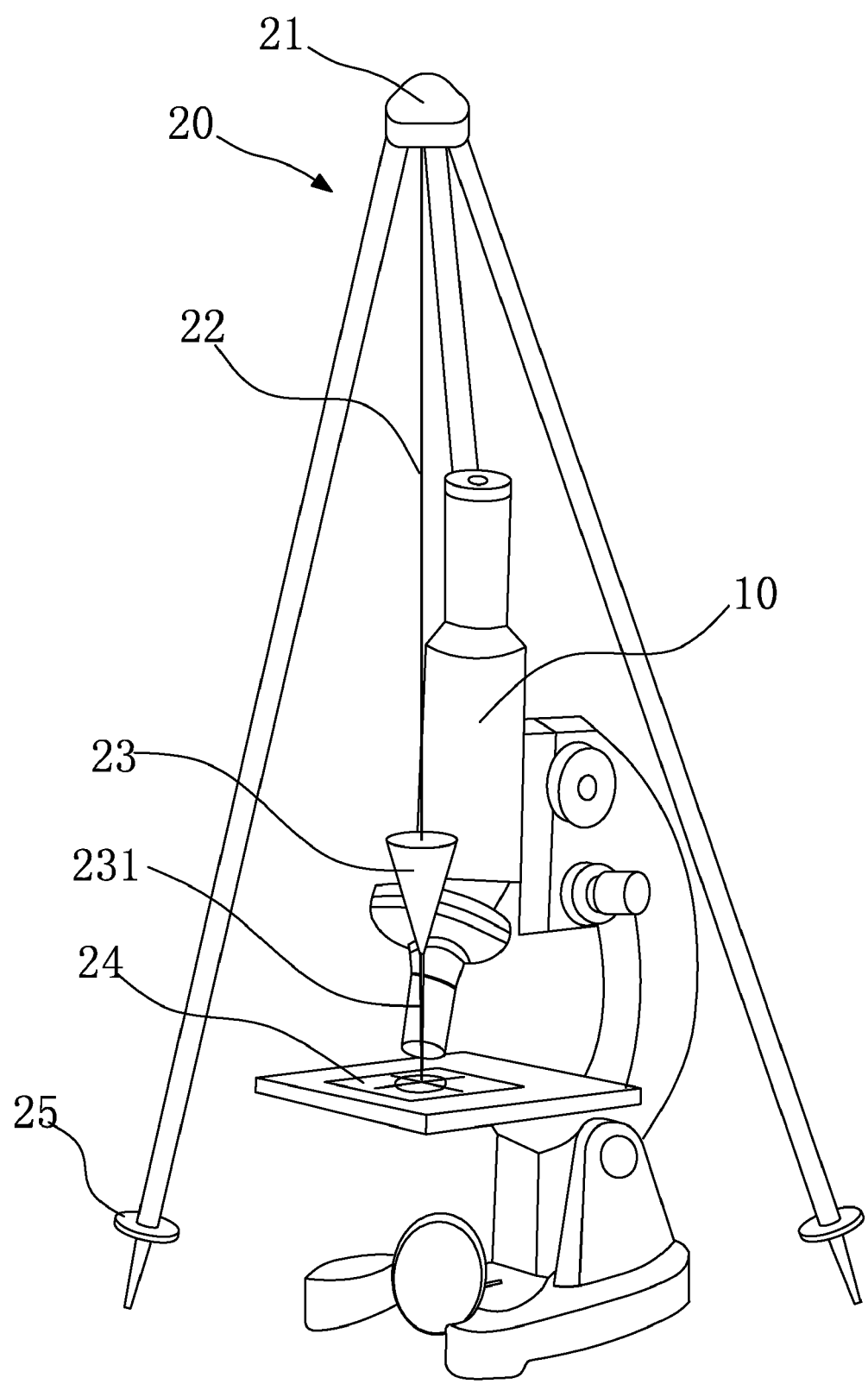
FIG. 1 is a schematic view of the ground surface tiltmeter according to a first embodiment of the present invention.
Figure 2:
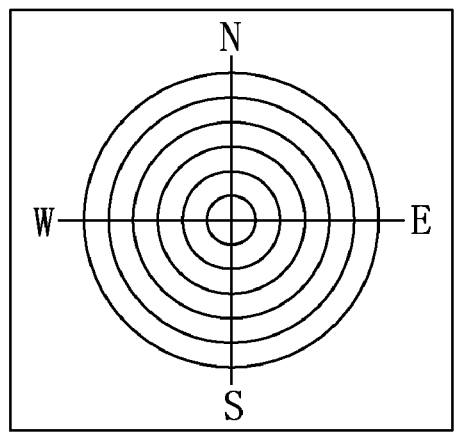
FIG. 2 is a schematic view of the dial disc of the ground surface tiltmeter according to the first embodiment of the present invention.

As shown in FIG. 1 and FIG. 2, the sensitive ground surface tiltmeter by using microscope for micro measuring of the invention comprises a main body 20 of the ground surface tiltmeter and a micro-measuring device, the main body 20 of the ground surface tiltmeter is a vertical pendulum ground surface tiltmeter, comprising a support and a pendulum system. The pendulum system comprises a cone pendulum bob 23 and a hanging thread 22, wherein the hanging thread 22 hangs the cone pendulum bob 23 on the top of the support 21, and the tip of the cone pendulum bob 23 points to the origin of coordinates of the dial disc 24. The micro measuring device 10 is an optical microscope, and the focus of objective lens of the microscope 10 is coincident to the origin of coordinates of the dial disc 24.

The calibration on the dial disc 10 is a series of concentric circles with equidifferent radius taking the origin of coordinates as center. The unit of radius of these concentric circles is Mimi meters. The dial disc 24 is made of anti-corrosive metal plate, and the surface is optically grinded.

When assembly the ground surface tiltmeter, firstly put the dial disc 24 under the objective lens of the microscope 10, make the focus of objective lens of the microscope 10 coincident to the central origin of coordinates of the dial disc 24, and simultaneously adjust the direction of the dial disc 24 so as to make the marked direction to be the true direction. And then adjusts a balance adjusting device 25 of the support to make the tip of the cone pendulum bob 23 point to the origin of coordinates of the dial disc.

When the ground gradient changes, because the cone pendulum bob 23 and the hanging thread 22 maintains in vertical directions, the cone pendulum bob 23 may shift relative to the dial disc according to the ground gradient degree. By observing and recording the deviation distance and direction of the cone tip from the center of the dial disc with the microscope 10, the angle of ground gradient degree (arc second) may be calculated according to the length of the hanging thread 22, the height of the cone pendulum bobs 23 and the actual amplification factor of the microscope.

The invention may greatly increase measuring accuracy of the ground surface tiltmeter because of adopting the microscope 10 to amplify the slight deviation of the cone pendulum bob 23. Simultaneously, the cone pendulum bob 23 may take deviation to any direction, only such a vertical pendulum ground surface tiltmeter can determine the angle and direction of the ground gradient.

Figure 3:
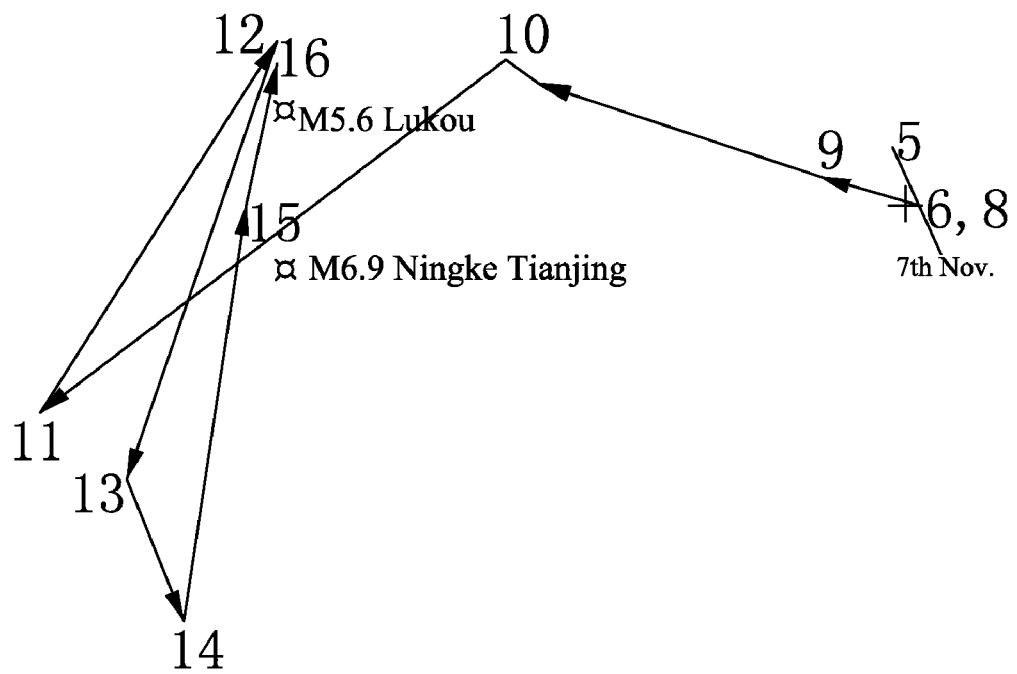
FIG. 3 is a vector diagram of ground gradient measured when the ground surface tiltmeter applied to the earthquake forecast according to the first embodiment of the present invention.
Figure 4:
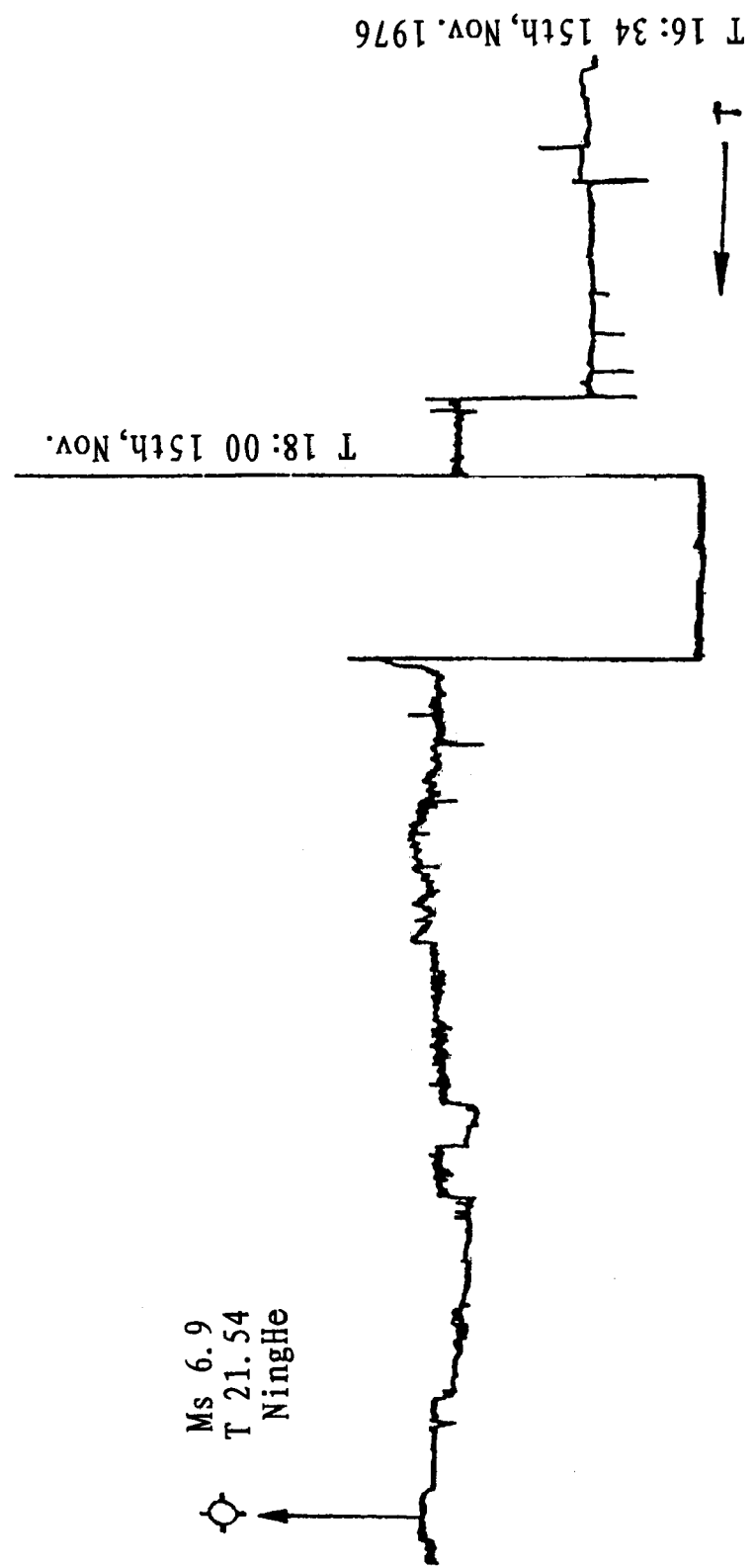
FIG. 4 is the terrestrial current curve anomaly map observed by automatic electric current meter when carrying on the earthquake monitoring forecast corresponding to the FIG. 3.

The inventor used the vertical pendulum ground surface tiltmeter in this embodiment to carry on experiment in the three years of 1975-1978. FIG. 3 is the vector diagram of ground gradient measured by the ground surface tiltmeter applied to the earthquake forecast between $7^{th}$ Nov. to 16th November, 1976 in Chaoyang City LiaoNing Province. FIG. 4 is the measuring result of the automatic electric current meter used for measuring the terrestrial current. The inventor successfully forecasted M 5.6 earthquake of Lulong, Hebei on $12^{th}$ Nov. 1976 and M6.9 earthquake of Ninghe, Tianjin on $15^{th}$ Nov. 1976 according to the above the measurement result. The inventor has successfully forecasted dozens of times earthquake according to observation result of the vertical pendulum ground surface tiltmeter together with the automatic electric current meter observation result, and summarized a method for forecasting earthquake, of which the time is from hours to one week; the range is within 600 km; and the magnitude is 3-7 level above. He had no oversight but only have some misinformation in the condition without removing disturbance. Thus it is extrapolated that the earthquakes forecast is feasible!

Figure 5:
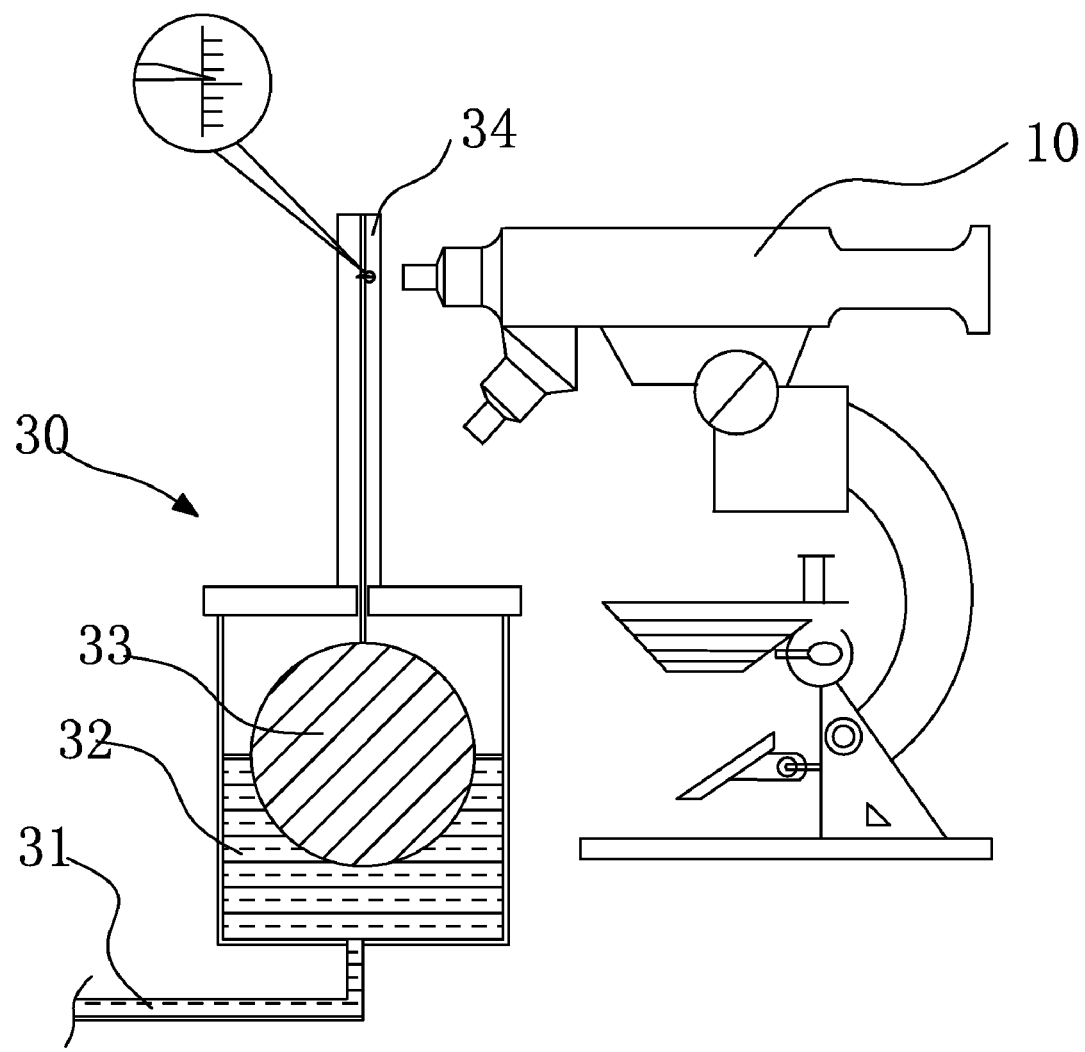
FIG. 5 is a schematic view of the ground surface tiltmeter according to a second embodiment of the present invention.

FIG. 5 shows a second embodiment of the present invention.

As shown in FIG. 5, the sensitive ground surface tiltmeter by using microscope for micro measuring of the invention, comprises a main body 30 of the ground surface tiltmeter and a micro-measuring device, wherein the main body 30 of the ground surface tiltmeter is a horizontal pendulum ground surface tiltmeter, comprising a horizontal pendulum system which comprises a horizontal connected tube 31. Two horizontal pendulum ground surface tiltmeters are always connected together by the connected tube 31 when using. The micro measuring device is an optical microscope 10, and the objective lens of the microscope 10 is just opposite to the pointer marking the liquid level of the horizontal connected tube. The horizontal pendulum ground surface tiltmeter utilizes the principle that water surface is horizontal under natural condition, and when the ground inclines, the horizontal connected tube 31 also inclines with the ground, but the liquid 32 inside still maintains horizontal. The relative position change between the liquid and the horizontal connected tube 31 causes the floater 33 changing its relative position to the connected tubes changes 31, thus make the pointer on the dial disc indicates the changes of the liquid height. The In the invention, the microscope is adopted to amplify slight change of the calibration pointed by the pointer, thus increases measuring accuracy of the ground surface tiltmeter and provides accurate ground gradient parameters.

What is claimed is:

1. A sensitive ground surface tiltmeter comprising:
   a ground surface tiltmeter for showing ground tilt and a micro-measuring device for measuring the ground tilt;
   the ground surface tiltmeter is a vertical pendulum ground surface tiltmeter comprising:
   a support;
   a vertical pendulum system, including a hanging thread for hanging a pendulum bob with a dial pointer on the top of the support;
   the micro measuring device comprising
   a dial disc with coordinates;
   an optical microscope, the focus of objective lens of the microscope is coincident to the origin of the coordinates of the dial disc, and the dial pointer of the pendulum bob is just opposite to the origin of the coordinates of the dial disc.

2. The sensitive ground surface tiltmeter according to claim 1, wherein the calibration of said dial disc comprises a series of concentric circles with equidifferent radius taking the origin of coordinates as center.

3. The sensitive ground surface tiltmeter according to claim 1, wherein the pendulum bob is a cone, the cone tip is the calibration pointer.

4. The sensitive ground surface tiltmeter according to claim 1, wherein the ground surface tiltmeter is a horizontal pendulum ground surface tiltmeter having a horizontal pendulum system with a horizontal connected tube, the micro measuring device is an optical microscope, the objective lens of the microscope is just opposite to a pointer marking the liquid level of the horizontal connected tube.

5. The sensitive ground surface tiltmeter according to claim 4, wherein a floater is floated in the liquid inside the horizontal connected tube, the ground incline to cause the horizontal connected tube to incline, then makes the relative position change between the floater and the horizontal connected tube, thereby the pointer on a dial disc indicates the changes of the liquid height.

* * * * *